Aug. 17, 1926.
D. S. GARCIA
1,596,172
CONDENSATION EJECTOR TRAP
Filed Dec. 7, 1925
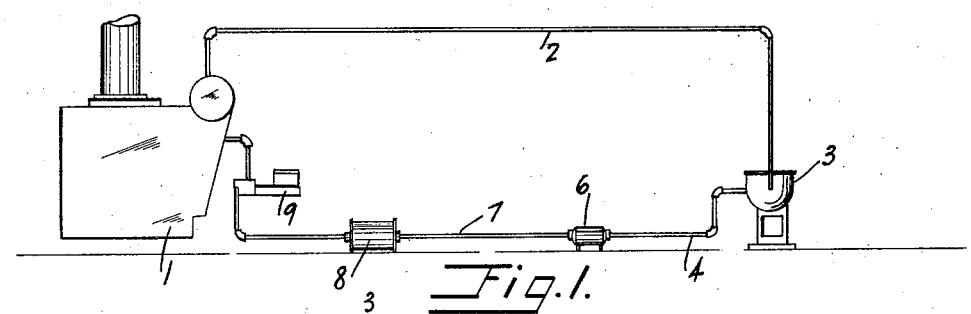
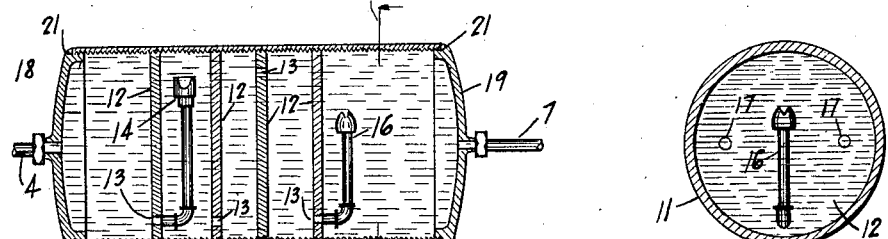
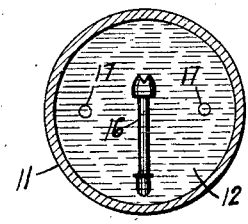
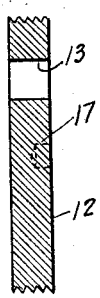
INVENTOR.
DAVID S. GARCIA.
BY
ATTORNEYS.

Patented Aug. 17, 1926.

1,596,172

UNITED STATES PATENT OFFICE.

DAVID S. GARCIA, OF OAKLAND, CALIFORNIA.

CONDENSATION EJECTOR TRAP.

Application filed December 7, 1925. Serial No. 73,938.

The present invention relates to improvements in condensation ejector traps and has particular reference to a trap adapted to be used on the exhaust side of a steam using apparatus such as the press or the mangles in a laundry or similar devices.

It is proposed in this connection to provide a trap that is extremely simple in construction, takes up very little space and has no working parts such as valves or floats or the like. The trap is intended to allow the waters of condensation to escape therethrough but to form a seal against the steam.

Further objects and advantages of my invention will appear as the specification proceeds.

The preferred form of the invention is shown in the accompanying drawing, in which—

Figure 1 shows a general scheme of which my trap forms a part.

Figure 2 a vertical section through the trap along the axis thereof.

Figure 3 a transverse section through the trap taken along lines 3—3 of Figure 2, and Figure 4 detailed view showing one of the disks used in my device in section.

While I have shown only a preferred form of the invention, I wish to have it understood that various changes or modifications may be made within the scope of the claims hereto attached without departing from the spirit of the invention.

In Figure 1 is shown the general scheme including a boiler 1, a steam pipe 2 connecting with the machine 3 which latter may be of any kind that uses steam for the purposes it is intended for, an exhaust pipe 4 for the said machine connecting with my trap 6 which latter connects through a pipe 7 with a low pressure receiver 8 and from there through what is known as a lift trap 9 with the boiler.

My trap is preferably made of a cylindrical body 11 formed with an internal thread throughout the length thereof and a plurality of disks 12 threaded externally and adapted to be screwed into the cylindrical body and to be stopped at any place desired so that a plurality of chambers are formed between the disks. The size of the chambers may be adjusted by screwing the disks forward or backward; each disk is formed with a port 13 of small cross-sections through which water may escape from one chamber into the next chamber. In addition to this two nozzles 14 and 16 are connected with two of the ports, preferably those of the first and last disks in such a manner that any water passing through the trap has to pass through this nozzle. The disks are also formed with recesses 17 in the faces thereof which latter may be used to apply a wrench of suitable form for threading the disk into the cylinder body. The two ends of the body are closed by means of caps 18 and 19 which latter thread into the body and are formed with a shoulder 21 bearing upon the end faces of the cylinder, the contacting faces being formed so as to establish a water tight joint adapted to resist any pressure that may occur. An intake pipe 4 connects with one of the pipes and an exhaust pipe 7 with the other.

When my trap is connected to the exhaust side of the machine using the steam in the manner indicated in Figure 1 the water of condensation is forced into the trap, entering through the pipe 4, and striking the first disk 12. It then is forced through the port 13 and the nozzle 14 of restricted opening into the second chamber from which it passes into the third chamber through the port 13 in the second disk 12 and into the next chamber through the port in the next disk until it is finally discharged into the last chamber through the nozzle 16. Having to pass through so many openings of restricted area, sufficient resistance is offered to the flow of water to make its progress very slow, the adjustment being made in such a manner that the trap will always be full of water of condensation when the machine is running so that no steam may pass through the trap while the water of condensation is allowed to escape.

It will thus be seen that my trap is continuous in operation, has no working parts to get out of order and is always operative without requiring any attention. The possibility of becoming air-bound is also avoided.

I claim:

A condensation ejector trap of the character described, comprising an internally threaded cylinder having removable caps threaded into the ends thereof with intake and outlet openings in the caps respectively, a plurality of discs threaded into the cylinder in spaced relation to form chambers therebetween and formed with small eccentric ports adapted to be disposed in non-registering relation and with pipes extending from some of said ports diametrically into the adjacent chambers and terminating in nozzles.

In testimony whereof I have affixed my signature.

DAVID S. GARCIA.